United States Patent
Tan et al.

(10) Patent No.: US 12,293,031 B2
(45) Date of Patent: May 6, 2025

(54) IMAGE SENSING SYSTEM CONTROL METHOD AND IMAGE SENSING SYSTEM

(71) Applicant: PixArt Imaging Inc., Hsin-Chu (TW)

(72) Inventors: Zi Hao Tan, Penang (MY); Kevin Len-Li Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/371,463

(22) Filed: Sep. 22, 2023

(65) Prior Publication Data
US 2025/0103153 A1 Mar. 27, 2025

(51) Int. Cl.
*G06F 3/038* (2013.01)
*G06F 3/0354* (2013.01)

(52) U.S. Cl.
CPC ........ *G06F 3/0383* (2013.01); *G06F 3/03543* (2013.01)

(58) Field of Classification Search
CPC .............. G06F 3/0383; G06F 3/03543; G06F 3/0304–0325; G06F 3/042–0428
See application file for complete search history.

(56) References Cited

U.S. PATENT DOCUMENTS

2021/0172755 A1* 6/2021 Song .................. G01C 21/3626
2021/0271334 A1* 9/2021 Lye ......................... H03K 21/08

* cited by examiner

*Primary Examiner* — Lisa S Landis
(74) *Attorney, Agent, or Firm* — Winston Hsu (57) ABSTRACT

An image sensing system control method, applied to an image sensing system comprising an image sensor and a control circuit. The method comprises: (a) defining a first reporting frame sensed at a first reporting frame time and a second reporting frame sensed at a second reporting frame time, wherein the image sensor reports motions computed according to the first reporting frame after the first reporting frame time, and reports motions computed according to the second reporting frame after the second reporting frame time; and (b) adjusting a first reporting time interval between the first reporting frame time and the second reporting frame time, to adjust the second reporting frame time to meet a second target time. The second reporting frame time is after the first reporting frame time.

19 Claims, 6 Drawing Sheets

IMAGE SENSING SYSTEM CONTROL METHOD AND IMAGE SENSING SYSTEM

BACKGROUND OF THE INVENTION

1. Field of the Invention

The present invention relates to an image sensing system control method and an image sensing system, and particularly relates to an image sensing system control method and an image sensing system which can reduce the non-synchronization between the frame rate and the polling command.

2. Description of the Prior Art

In an optical navigation device such as an optical mouse, the image sensor thereof captures frames at a predetermined frame rate and then computes the motion deltas between different frames. Such predetermined frame rate may change corresponding to different modes, for example, an active mode or a standby mode. Also, a MCU (micro control unit) polls the image sensor for motion delta (i.e. request the image sensor to output motion delta). However, the MCU polling rate and the image sensor frame rate are usually different and non-synchronized with each other. As a result, motion delta output and MCU polling are always non-consistent.

SUMMARY OF THE INVENTION

One objective of the present invention is to provide an image sensing system control method which can reduce effect caused by the non-synchronization between the polling commands and the frame rates.

Another objective of the present invention is to provide an image sensing system which can reduce effect caused by the non-synchronization between the polling commands and the frame rates.

One embodiment of the present invention discloses an image sensing system control method, applied to an image sensing system comprising an image sensor and a control circuit. The method comprises: (a) defining a first reporting frame sensed at a first reporting frame time and a second reporting frame sensed at a second reporting frame time, wherein the image sensor reports motions computed according to the first reporting frame after the first reporting frame time, and reports motions computed according to the second reporting frame after the second reporting frame time; and (b) adjusting a first reporting time interval between the first reporting frame time and the second reporting frame time, to adjust the second reporting frame time to meet a second target time. The second reporting frame time is after the first reporting frame time.

Another embodiment of the present invention discloses an image sensing system, comprising: a control circuit; and an image sensor, configured to perform: (a) defining a first reporting frame sensed at a first reporting frame time and a second reporting frame sensed at a second reporting frame time, wherein the image sensor reports motions computed according to the first reporting frame after the first reporting frame time, and reports motions computed according to the second reporting frame after the second reporting frame time; and (b) adjusting a first reporting time interval between the first reporting frame time and the second reporting frame time, to adjust the second reporting frame time to meet a second target time. The second reporting frame time is after the first reporting frame time.

In view of above-mentioned embodiments, the image sensor may report the motions at the time synchronized with the polling commands, even if the frame rate changes frequently. Accordingly, the effect caused by non-synchronization between the frame rate and the polling commands can be reduced.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present invention. The components in each embodiment can be implemented by hardware (e.g. a circuit or a device), or by firmware (such as a processor installed with at least one program). Further, the components in each embodiment can be separated into more components or be integrated to fewer components. Additionally, the term "first", "second" . . . in following descriptions are only for distinguishing elements or steps, but do not mean to limit the sequence thereof.

Figure 1:
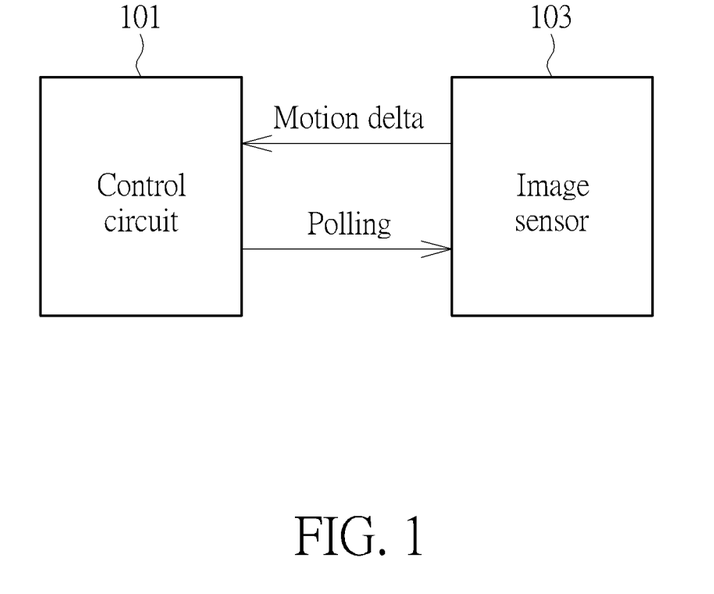
FIG. 1 is a block diagram illustrating an image sensing system according to one embodiment of the present invention.

FIG. 1 is a block diagram illustrating an image sensing system 100 according to one embodiment of the present invention. As illustrated in FIG. 1, the image sensing system 100 comprises a control circuit 101 and an image sensor 103. The control circuit 101 can be above-mentioned MCU or any other device which can perform the same function, such as a processor. The image sensor 103 is configured to sense a plurality of frames and to compute motion deltas between different frames. The control circuit 101 generates polling commands to the image sensor 103, and the image sensor 103 output motion deltas responding to the polling commands. The control circuit 101 and the image sensor 103 can be provided in the same device, but can be provided in different devices as well.

Figure 2:
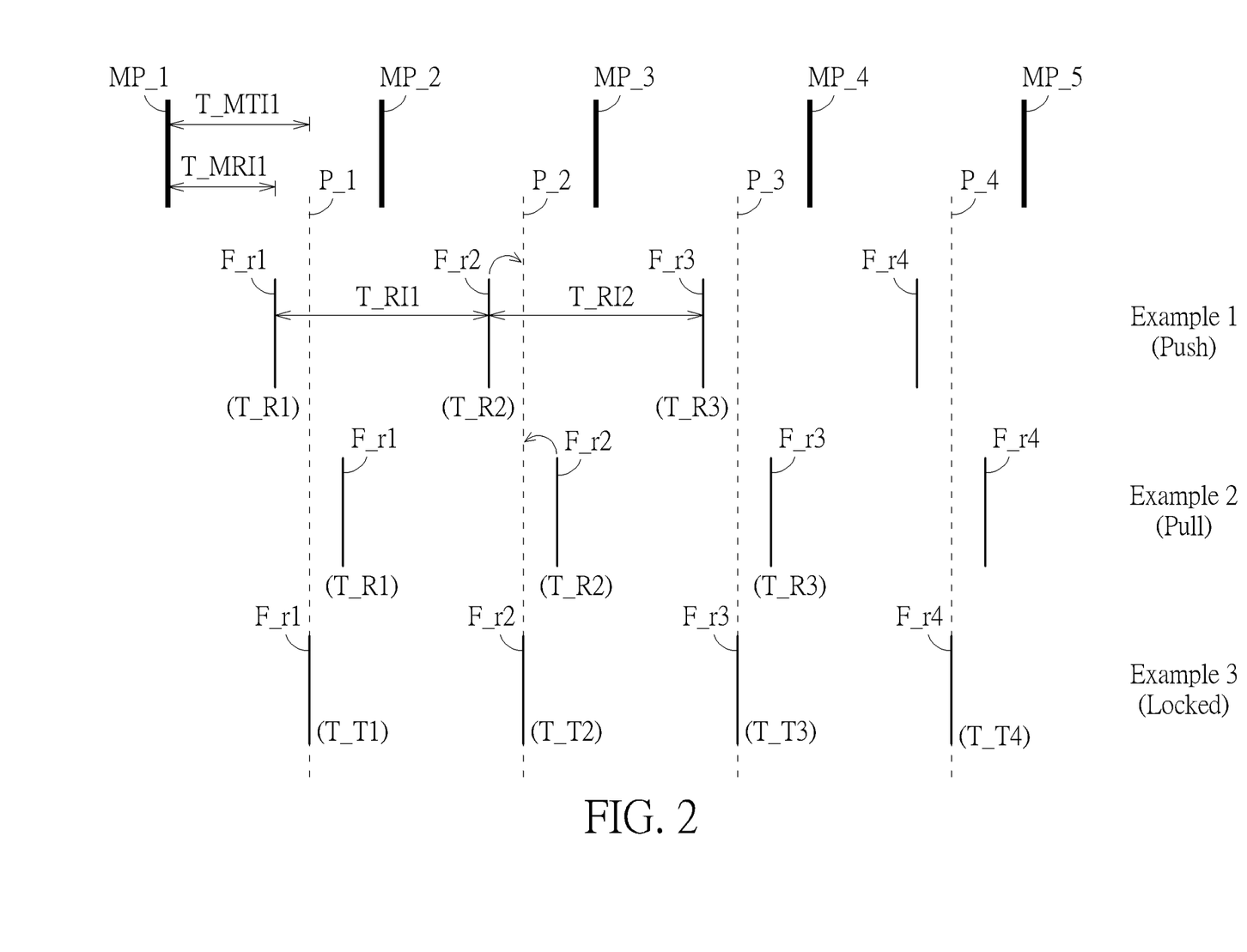
FIG. 2 is a schematic diagram illustrating the steps of adjusting at least one reporting time interval, according to one embodiment of the present invention.

FIG. 2 is a schematic diagram illustrating the steps of adjusting at least one reporting time interval, according to one embodiment of the present invention. The embodiment of FIG. 2 comprises three examples: Example 1, Example 2 and Example 3. In each of the examples, a first reporting frame F_r1 and a second reporting frame F_r2 are defined. The first reporting frame F_r1 is sensed at a first reporting frame time T_R1 and the second reporting frame F_r2 is sensed at a second reporting frame time T_R2 after the first reporting frame time T_R1. The image sensor 103 reports motions computed according to the first reporting frame F_r1 after the first reporting frame time T_R1, and reports motions computed according to the second reporting frame F_r2 after the second reporting frame time T_R2. In one embodiment, the image sensor 103 reports motions responding to a polling command which is after and closest to the frame which is used for motion calculation. For example, in FIG. 2, the image sensor 103 reports motions computed according to the first reporting frame F_r1 responding to the polling command MP_2 (second polling command), and reports motions computed according to the second reporting frame F_r2 responding to the polling command MP_3 (third polling command).

The first reporting frame F_r1 and the second reporting frame F_r2 can be defined by various methods. In one embodiment, sequence information of the first reporting frame F_r1 and the second reporting frame F_r2 are respectively identical with sequence information of frames which are already synchronized with polling commands from the control circuit 101. For example, sequences of frames in a predetermined time period are counted, thus it can be acquired that the $15^{th}$ frame, the $30^{th}$ frame, the $45^{th}$ frame in the predetermined time period are synchronized with polling commands. By this way, in later sensing operations, the 15Kth frames (K is a positive interfere) are set as the motion reporting frames. However, the motion reporting frames can be defined by other methods rather than limited to these examples.

After the first reporting frame F_r1 and the second reporting frame F_r2 are defined, a first reporting time interval T_RI1 between the first reporting frame time T_R1 and the second reporting frame time T_R2 is adjusted, such that the second reporting frame time T_R2 is adjusted to meet a second target time T_T2. In other words, the sensing of the second reporting frame F_r1 is adjusted to meet the second target time T_T2. In one embodiment, an initial first reporting time interval T_RI1 is equal to a time interval between two adjacent polling commands. For example, the initial first reporting time interval T_RI1 is equal to a time interval between the polling command MP_1 (first polling command) and the polling command MP_2 (second polling command).

Also, in one embodiment, the first reporting time interval T_RI1 is adjusted after the first reporting frame F_r1 is sensed and before the second reporting frame F_r2 is sensed. In another embodiment, the first reporting time interval T_RI1 is adjusted before the first reporting frame F_r1 and the second reporting frame F_r2 are sensed. Please note, the first reporting frame time T_R1 and the second reporting frame time T_R2 can still be acquired by the image sensor 103, even if the first reporting frame F_r1 and the second reporting frame F_r2 are not sensed yet, since the first reporting frame time T_R1 and the second reporting frame time T_R2 may be defined by above-mentioned steps thus the first reporting frame time T_R1 and the second reporting frame time T_R2 are already acquired.

In one embodiment, a target reporting delay time interval between a target time and a polling command which is a closest polling command among the polling commands previous to the target time is computed. For example, a target reporting delay time interval T_MTI1 between the first target time T_T1 and a polling command MP_1 previous to the first target time T_T1 is computed. Also, a reporting delay time interval between a motion reporting frame and a polling command which is a closest polling command among the polling commands previous to the target time is computed. For example, a reporting delay time interval T_MRI1 between the first reporting frame F_r1 and a polling command MP_1 s computed.

Afterwards, the first reporting time interval T_RI1 is adjusted according to a relation between the target reporting delay time interval T_MTI1 and the reporting delay time interval T_MRI1. In one embodiment, if the reporting delay time interval T_MRI1 is smaller than the target reporting delay time interval T_MTI1, the first reporting time interval T_RI1 is increased by a shift value. By this way, the second reporting frame F_r2 is pushed to the second target time T_T2, as shown in the Example 1 of FIG. 2.

On the contrary, if the reporting delay time interval T_MRI1 is larger than the target reporting delay time interval T_MTI1, the first reporting time interval T_RI1 is decreased by the shift value. By this way, the second reporting frame F_r2 is pulled to the second target time T_T2, as shown in the Example 2 of FIG. 2. Besides, in the Example 3, the reporting delay time interval T_MRI1 is equal to the target reporting delay time interval T_MTI1, which means the second reporting frame F_r2 is already synchronized with the second target time T_T2, thus the first reporting time interval T_RI1 is not adjusted.

In one embodiment, the shift value may be a constant value. In another embodiment, the shift value is a percentage of the first reporting time interval T_RI1, for example, 3% or 5% of the first reporting time interval T_RI1. In such case, the first reporting time interval T_RI1 can be gradually and consistently adjusted until the second reporting frame time T_R2 meets the second target time T_T2. In another embodiment, the second reporting frame time T_R2 can be instantly adjusted to meet the second target time T_T2. In such case, the shift value is equal to a difference between the target reporting delay time interval T_MTI1 and the reporting delay time interval T_MRI1.

In one embodiment, a time difference between the first target time T_T1 and one of the polling commands (e.g., the polling command MP_2) which is closest to the first target time T_T1 is a necessary time for generating the motions computed according to the first reporting frame F_r1. Also, a time difference between the second target time T_T2 and one of the polling commands (e.g., the polling command MP_3) which is closest to the second target time T_T2 is a necessary time for generating the motions computed according to the second reporting frame F_r2. Such necessary time may be the time for buffering frames for motion computation and/or the time needed for computing motions. However, if the speed of the image sensor 103 is fast enough, such necessary time can be regarded as 0. In such case, the first target time T_T1 can be the same as the time of receiving the polling command MP_1 and the second target time T_T1 can be the same as the time of receiving the polling command MP_2.

The above-mentioned steps in FIG. 2 can be performed to reporting frames following the second reporting frame F_r2. Please refer to FIG. 2 again. In FIG. 2, a third reporting frame F_r3 is defined. The third reporting frame F_r3 is sensed at a third reporting frame time T_R3 after the second reporting frame time T_R2. The image sensor 103 reports motions, which are computed according to the third reporting frame F_r3, after the third reporting frame time T_R3. For example, the image sensor 103 reports motions computed according to the third reporting frame F_r3, responding to the polling command MP_3.

Afterwards, the second reporting time interval T_RI2 between the second reporting frame time T_R2 and the third reporting frame time T_R3 is adjusted, to adjust the third reporting frame time T_R3 to meet a third target time P_3.

In one embodiment, the steps of adjusting the first reporting time interval T_R1 and the second reporting time interval T_R2 are simultaneously performed. Also, in one embodiment, the first reporting time interval T_R1 and the second reporting time interval T_R2 have the same values.

Other details of adjusting the second reporting time interval T_RI2 are illustrated in above-mentioned embodiments, thus are omitted for brevity here. The steps of adjusting reporting time intervals can be periodically performed, for example, the reporting time intervals are adjusted every 100 frames. Alternatively, the steps of adjusting reporting time intervals can be triggered by a command. Additionally, the steps of adjusting reporting time intervals can be triggered by a mode switching of an optical device comprising the control circuit 101 and the image sensor 103 in FIG. 1. For example, the steps of adjusting reporting time intervals can be triggered when an optical mouse switches from a standby mode to an active mode.

Figure 3:
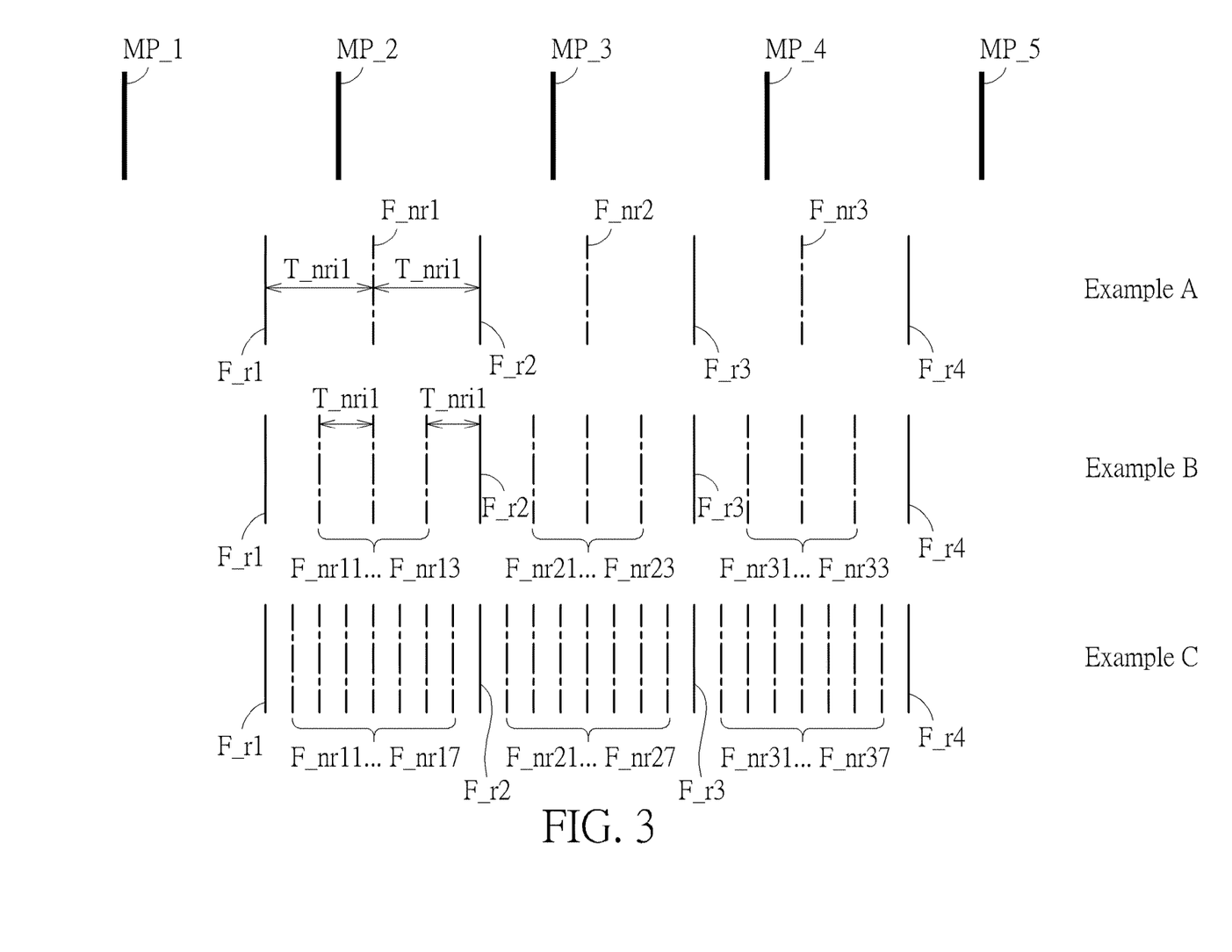
FIG. 3, and FIG. 4 are schematic diagrams illustrating the steps of setting non-reporting time intervals, according to embodiments of the present invention.
Figure 4:
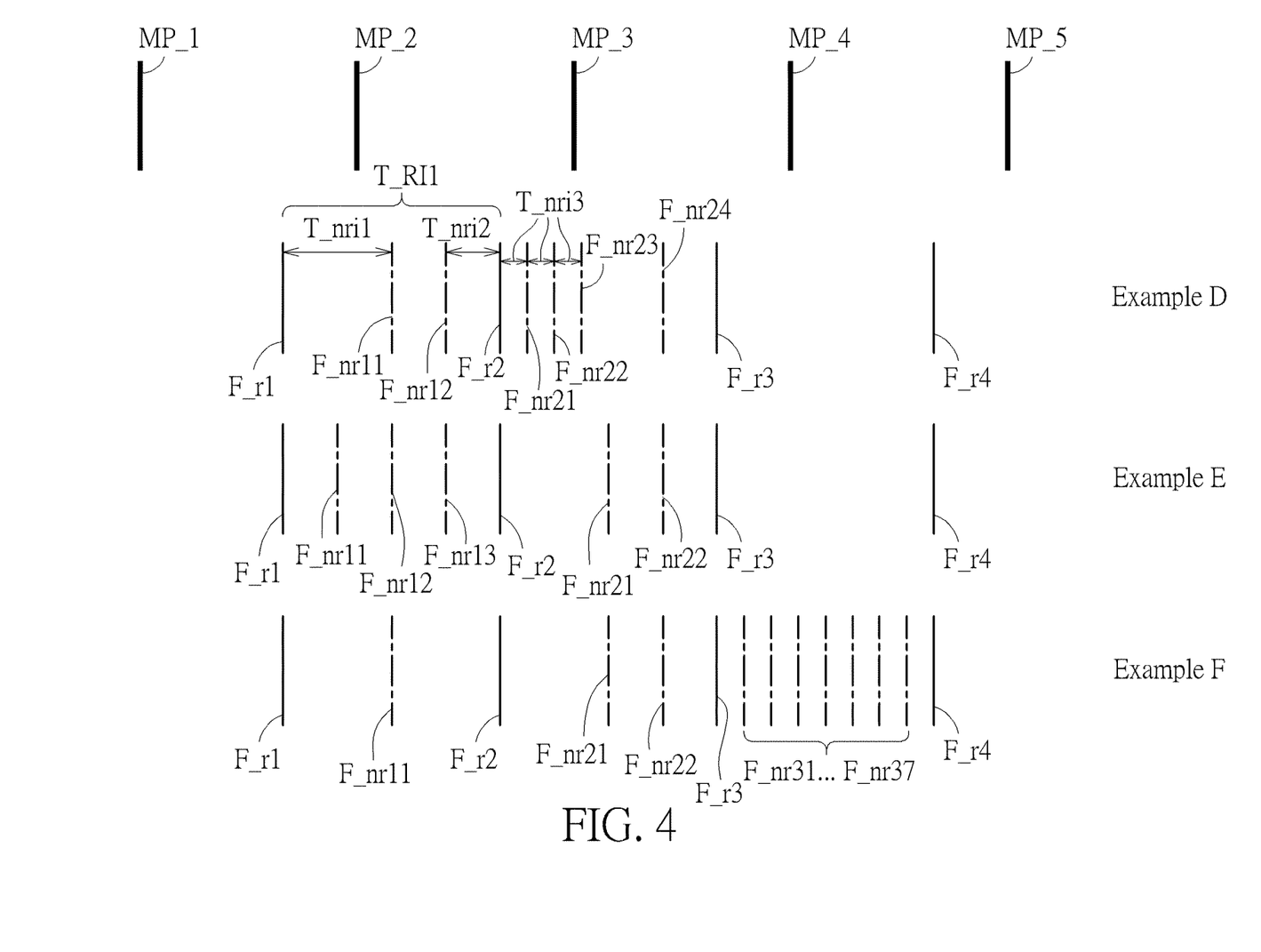

In one embodiment, at least one non-reporting frame is sensed between the reporting frames. FIG. 3 and FIG. 4 are schematic diagrams illustrating the steps of setting non-reporting time interval, according to embodiments of the present invention. Please note, for the convenience of understanding, the lines of target time in FIG. 1 and FIG. 2 are not illustrated in the embodiments of FIG. 3 and FIG. 4. FIG. 3 comprises three examples: Example A, Example B and Example C. In the embodiment of FIG. 3, first non-reporting time intervals of at least one first non-reporting frame F_nr11 . . . . F_nr37 are computed, and the first non-reporting frame F_nr11 . . . . F_nr37 are sensed based on the first non-reporting time intervals in following sensing operations. The first non-reporting time interval may be a time interval between the first reporting frame time and the first non-reporting frame which is closest to the first reporting frame. For example, the first non-reporting time interval may be a time interval T_nri1 between the first reporting frame time F_r1 and the first non-reporting frame F_nr1.

Also, the first non-reporting time interval may be a time interval between two adjacent first non-reporting frames. For example, the first non-reporting time interval T_nri1 may be a time interval between the first non-reporting frames F_nr11 and F_nr12 in Example B. Besides, the first non-reporting time interval may be a time interval between the second reporting frame and the first non-reporting frame which is closest to the second reporting frame. For example, the first non-reporting time interval T_nri1 is a time interval between the second reporting frame F_r2 and the first non-reporting frame F_nr1 in Example A, or a time interval between the second reporting frame F_r2 and the first non-reporting frame F_nr13 in Example B.

In one embodiment, values of the first non-reporting time intervals are equal to 1/X of the first reporting time interval T_RI1, wherein the X is a positive integer (1, 2, 3 . . . ). The first reporting time interval T_RI1 mentioned here may be the reporting time interval which has been adjusted via above-mentioned embodiments. Further, in one embodiment, X is $2^N$, N is a natural number (0, 1, 2, 3 . . . ). In Examples A, B, C of FIG. 3, N is respectively 1, 2, 3. When N=0, no non-reporting frame is sensed.

The first non-reporting time interval may be set corresponding to different requirements. In one embodiment, the image sensor 103 dynamically and automatically sets the first non-reporting time interval corresponding to different modes of an optical mouse which comprises the control circuit 101 and the image sensor 103. For example, if the optical mouse is in a standby mode or has a low speed, the first non-reporting time interval may be set to be lower, such that the image sensor 103 senses less frames in a predetermined time interval and consumes less power. On the contrary, if the optical mouse has a higher speed, the first non-reporting time interval may be set to be higher, such that the image sensor 103 senses more frames in a predetermined time interval and the motion computation can be more accurate.

In the embodiment of FIG. 3, the non-reporting time intervals are the same in a single reporting time interval and fixed in a whole sensing operation (e.g., in one example such as Example 1). However, it is not limited that the non-reporting time intervals are the same in a single reporting time interval or in a whole sensing operation. FIG. 4 comprises three examples: Example D, Example E, and Example F. In the Example D, non-reporting time intervals with different values exist in a single reporting time interval. For example, besides the first non-reporting time interval T_nri1 in the Example D, a second non-reporting time interval T_nri2 of a second non-reporting frame F_nr12 in Example D is further computed. The second non-reporting time interval T_nri2 is different from the first non-reporting time interval T_nri1.

As above-mentioned, the non-reporting time intervals can be $$\frac{1}{2^N}$$

of the first reporting time interval. Accordingly, in Example D of FIG. 4, N is 1 for the first non-reporting time interval T_nri1, and N is 2 for the second non-reporting time interval T_nri2. Similarly, the third non-reporting time intervals T_nri3 (N=3) for the third non-reporting frames F_nr21, F_nr22 and F_nr23 in Example D can be set following the above-mentioned steps. The definition of the second non-reporting time interval T_nri2 and the third non-reporting time interval T_nri3 are the same as which of the first non-reporting time interval T_nri1, thus descriptions thereof are omitted for brevity here. Following the same rule, N is 2 for the non-reporting time intervals of the non-reporting frames F_nr11, F_nr12 and F_nr13 in the Example E, and N are respectively 1 and 2 for the non-reporting time intervals of the non-reporting frames F_nr21, and F_nr22 in the Example E. Similarly, N is 1 for the non-reporting time interval of the non-reporting frame F_nr11 in the Example F, N is 2 for the non-reporting time interval of the non-reporting frame F_nr21, F_nr22 in the Example F, and N is 3 for the non-reporting time interval of the non-reporting frame F_nr31 . . . . F_nr37 in the Example F. Accordingly, the non-reporting time intervals may be different in a single reporting time interval or in a whole sensing operation.

Figure 5:
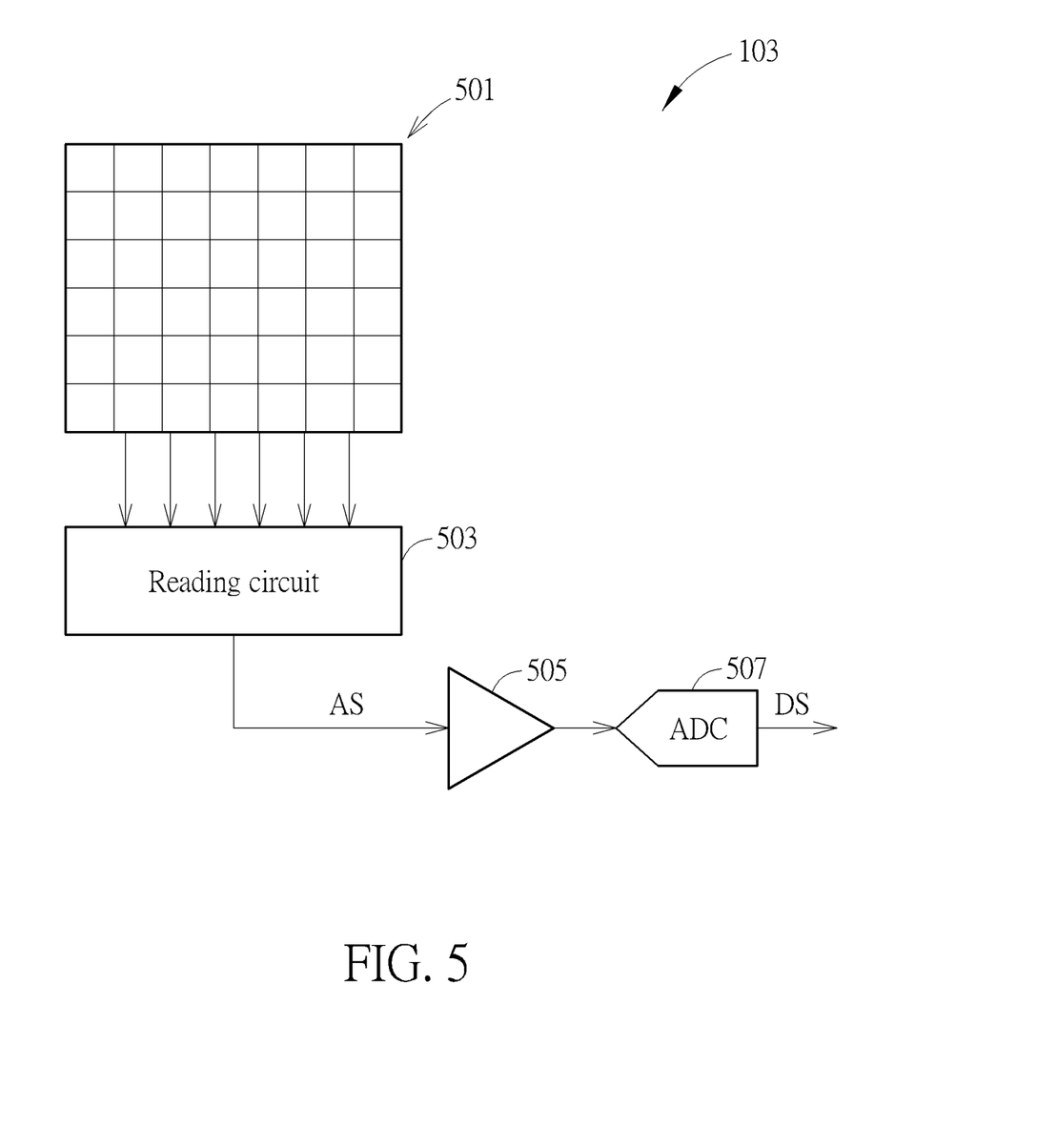
FIG. 5 is a schematic diagram illustrating different domains of the image signals, according to one embodiment of the present invention.

The above-mentioned embodiments can be performed in the analog domain or in the digital domain. FIG. 5 is a schematic diagram illustrating different domains of the image signals, according to one embodiment of the present invention. As shown in FIG. 5, the optical sensor 103 comprises a pixel array 501, a reading circuit 503, an amplifier 505 and an ADC (Analog to Digital Converter) 507. Pixel circuits in the pixel array 501 are configured to generate charges corresponding to received light. The reading circuit 503 is configured to read the charges to generate analog image signals AS. The amplifier 505, which can be removed in some embodiments is configured to generate amplified image signals. The ADC 507 is configured to convert the analog image signals AS to digital image signals DS. The above-mentioned embodiments can be performed based on the analog image signals AS or the digital image signals DS.

Figure 6:
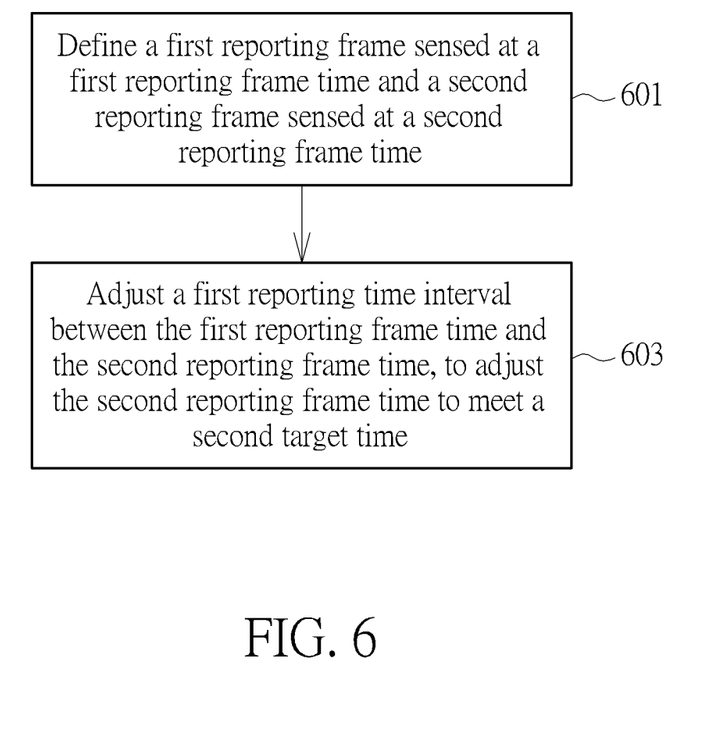
FIG. 6 is a flow chart illustrating an image sensing system control method, according to an embodiment of the present invention.

In view of above-mentioned embodiments, an image sensing system control method can be acquired. The image sensing system control method is applied to an image sensing system (e.g., the image sensing system 100 in FIG. 1) comprising an image sensor and a control circuit. FIG. 6 is a flow chart illustrating an image sensing system control method, according to an embodiment of the present invention. FIG. 6 comprises following steps:

Step 601

Define a first reporting frame (e.g., the first reporting frame F_r1 in FIG. 2) sensed at a first reporting frame time and a second reporting frame (e.g., the first reporting frame F_r2 in FIG. 2) sensed at a second reporting frame time.

The image sensor reports motions computed according to the first reporting frame after the first reporting frame time, and reports motions computed according to the second reporting frame after the second reporting frame time. The second reporting frame time is after the first reporting frame time Step 603

Adjust a first reporting time interval (e.g., the first reporting time interval T_RI1 in FIG. 2) between the first reporting frame time and the second reporting frame time, to adjust the second reporting frame time to meet a second target time (e.g., the second target time T_T2 in FIG. 2).

In view of above-mentioned embodiments, the image sensor may report the motions corresponding to the polling commands, even if the frame rate changes frequently. Accordingly, the effect caused by non-synchronization between the frame rate and the polling commands can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensing system control method, applied to an image sensing system comprising an image sensor and a control circuit, comprising:
    (a) defining a first reporting frame sensed at a first reporting frame time and a second reporting frame sensed at a second reporting frame time, wherein the image sensor reports motions computed according to the first reporting frame after the first reporting frame time, and reports motions computed according to the second reporting frame after the second reporting frame time; and
    (b) adjusting a first reporting time interval between the first reporting frame time and the second reporting frame time, to adjust the second reporting frame time to meet a second target time;
    wherein the second reporting frame time is after the first reporting frame time;
    wherein the image sensing system control method further comprises:
    computing first non-reporting time intervals of at least one first non-reporting frame; and
    sensing the first non-reporting frame according to the first non-reporting time intervals;
    wherein the first non-reporting time interval is at least one of:
    a time interval between the first reporting frame time and the first non-reporting frame which is closest to the first reporting frame, a time interval between two adjacent ones of the first non-reporting frames, and a time interval between the second reporting frame and the first non-reporting frame which is closest to the second reporting frame.

2. The image sensing system control method of claim 1, further comprising:
    computing second non-reporting time intervals of at least one second non-reporting frame, wherein the second non-reporting time interval is different from the first non-reporting time interval; and
    sensing the second non-reporting frame according to the second non-reporting time intervals;
    wherein the second non-reporting time interval is at least one of:
    a time interval between the first reporting frame time and the second non-reporting frame which is closest to the first reporting frame, a time interval between two adjacent ones of the second non-reporting frames, and a time interval between the second reporting frame and the first non-reporting closest to the second reporting frame.

3. The image sensing system control method of claim 1, wherein values of the first non-reporting time intervals are equal to 1/X of the first reporting time interval, wherein the X is a positive integer.

4. The image sensing system control method of claim 3, wherein X is $2^N$, N is a natural number.

5. The image sensing system control method of claim 1, further comprising:
    (c) defining a third reporting frame sensed at a third reporting frame time after the second reporting frame time, wherein the image sensor reports motions computed according to the third reporting frame after the third reporting frame time; and
    (d) adjusting a second reporting time interval between the second reporting frame time and the third reporting frame time, to adjust the third reporting frame time to meet a third target time;
    wherein the step (b) and (d) are simultaneously performed and the first reporting time interval and the second reporting time interval have the same values.

6. The image sensing system control method of claim 5, further comprising:
    computing third non-reporting time intervals of at least one third non-reporting frame; and
    sensing the third non-reporting frame according to the third non-reporting time intervals;
    wherein the third non-reporting time interval is at least one of:
    a time interval between the second reporting frame time and the third non-reporting frame which is closest to the second reporting frame, a time interval between two adjacent ones of the third non-reporting frames, and a time interval between the third reporting frame and the third non-reporting frame which is closest to the third reporting frame.

7. The image sensing system control method of claim 1, further comprising:
    receiving a plurality of polling commands from the control circuit by the image sensor;
    wherein a time difference between the first target time and one of the polling commands which is closest to the first target time is a necessary time for generating the motions computed according to the first reporting frame;

wherein a time difference between the second target time and one of the polling commands which is closest to the second target time is a necessary time for generating the motions computed according to the second reporting frame.

8. The image sensing system control method of claim 1, wherein sequence information of the first reporting frame and the second reporting frame are respectively identical with sequence information of frames which are already synchronized with polling commands from the control circuit.

9. The image sensing system control method of claim 8, further comprising:
counting sequences of frames in a predetermined time period;
wherein sequences of the first reporting frame and the second reporting frame are respectively identical with sequences of the frames which are already synchronized with the polling commands.

10. An image sensing system, comprising:
a control circuit; and
an image sensor, configured to perform:
(a) defining a first reporting frame sensed at a first reporting frame time and a second reporting frame sensed at a second reporting frame time, wherein the image sensor reports motions computed according to the first reporting frame after the first reporting frame time, and reports motions computed according to the second reporting frame after the second reporting frame time; and
(b) adjusting a first reporting time interval between the first reporting frame time and the second reporting frame time, to adjust the second reporting frame time to meet a second target time;
wherein the second reporting frame time is after the first reporting frame time;
wherein the image sensor further performs:
computing first non-reporting time intervals of at least one first non-reporting frame; and
sensing the first non-reporting frame according to the first non-reporting time intervals;
wherein the first non-reporting time interval is at least one of:
a time interval between the first reporting frame time and the first non-reporting frame which is closest to the first reporting frame, a time interval between two adjacent ones of the first non-reporting frames, and a time interval between the second reporting frame and the first non-reporting frame which is closest to the second reporting frame.

11. The image sensing system of claim 10, wherein the image sensor further performs:
computing second non-reporting time intervals of at least one second non-reporting frame, wherein the second non-reporting time interval is different from the first non-reporting time interval; and
sensing the second non-reporting frame according to the second non-reporting time intervals;
wherein the second non-reporting time interval is at least one of:
a time interval between the first reporting frame time and the second non-reporting frame which is closest to the first reporting frame, a time interval between two adjacent ones of the second non-reporting frames, and a time interval between the second reporting frame and the first non-reporting frame which is closest to the second reporting frame.

12. The image sensing system of claim 10, wherein values of the first non-reporting time intervals are equal to 1/X of the first reporting time interval, wherein the X is a positive integer.

13. The image sensing system of claim 12, wherein X is $2^N$, N is a natural number.

14. The image sensing system of claim 10, wherein the image sensor further performs:
(c) defining a third reporting frame sensed at a third reporting frame time after the second reporting frame time, wherein the image sensor reports motions computed according to the third reporting frame after the third reporting frame time; and
(d) adjusting a second reporting time interval between the second reporting frame time and the third reporting frame time, to adjust the third reporting frame time to meet a third target time;
wherein the step (b) and (d) are simultaneously performed and the first reporting time interval and the second reporting time interval have the same values.

15. The image sensing system of claim 14, wherein the image sensor further performs:
computing third non-reporting time intervals of at least one third non-reporting frame; and
sensing the third non-reporting frame according to the third non-reporting time intervals;
wherein the third non-reporting time interval is at least one of:
a time interval between the second reporting frame time and the third non-reporting frame which is closest to the second reporting frame, a time interval between two adjacent ones of the third non-reporting frames, and a time interval between the third reporting frame and the third non-reporting frame which is closest to the third reporting frame.

16. The image sensing system of claim 10, wherein the image sensor further performs:
receiving a plurality of polling commands from the control circuit by the image sensor;
wherein a time difference between the first target time and one of the polling commands which is closest to the first target time is a necessary time for generating the motions computed according to the first reporting frame;
wherein a time difference between the second target time and one of the polling commands which is closest to the second target time is a necessary time for generating the motions computed according to the second reporting frame.

17. The image sensing system of claim 10, wherein sequence information of the first reporting frame and the second reporting frame are respectively identical with sequence information of frames which are already synchronized with polling commands from the control circuit.

18. The image sensing system of claim 17, wherein the image sensor further performs:
counting sequences of frames in a predetermined time period;
wherein sequences of the first reporting frame and the second reporting frame are respectively identical with sequences of the frames which are already synchronized with the polling commands.

19. An image sensing system control method, applied to an image sensing system comprising an image sensor and a control circuit, comprising:
  (a) defining a first reporting frame sensed at a first reporting frame time and a second reporting frame sensed at a second reporting frame time, wherein the image sensor reports motions computed according to the first reporting frame after the first reporting frame time, and reports motions computed according to the second reporting frame after the second reporting frame time; and
  (b) pushing or pulling the second reporting frame time to meet a second target time;
  wherein the second reporting frame time is after the first reporting frame time;
  wherein the image sensing system control method further comprises:
  computing first non-reporting time intervals of at least one first non-reporting frame; and
  sensing the first non-reporting frame according to the first non-reporting time intervals;
  wherein the first non-reporting time interval is at least one of:
  a time interval between the first reporting frame time and the first non-reporting frame which is closest to the first reporting frame, a time interval between two adjacent ones of the first non-reporting frames, and a time interval between the second reporting frame and the first non-reporting frame which is closest to the second reporting frame.

* * * * *